United States Patent
Li et al.

(10) Patent No.: US 8,452,191 B2
(45) Date of Patent: May 28, 2013

(54) ELECTRONIC COMPENSATION OF NONLINEAR EFFECTS OF SEMICONDUCTOR OPTICAL AMPLIFIERS

(75) Inventors: Guifang Li, Oviedo, FL (US); Xiaoxu Li, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 419 days.

(21) Appl. No.: 12/728,404

(22) Filed: Mar. 22, 2010

(65) Prior Publication Data

US 2010/0239270 A1    Sep. 23, 2010

Related U.S. Application Data

(60) Provisional application No. 61/162,073, filed on Mar. 20, 2009.

(51) Int. Cl.
*H04B 10/06* (2006.01)

(52) U.S. Cl.
USPC ........... 398/208; 398/158; 398/159; 398/212; 398/214

(58) Field of Classification Search
USPC .................................. 398/158, 159, 208–214
See application file for complete search history.

(56) References Cited

U.S. PATENT DOCUMENTS 7,672,599 B2 * 3/2010 Essiambre et al. ............ 398/193
2010/0165348 A1 * 7/2010 Fleischer et al. .............. 356/458

OTHER PUBLICATIONS

Downie et al: "Performance of an MLSE-EDC Receiver with SOA-Induced Nonlinear Impairments", IEEE Photonics technology Letters, vol. 20, No. 15, Aug. 1, 2008, pp. 1326-1328.*
Li et al: "Electronic post-compensation of WDM transmission impariments using coherent detection and digital signal processing", Optics Express, vol. 16, No. 2, Jan. 21, 2008.*
Agrawal et al: "Self-Phase Modulation and Spectral Broadening of Optical Pulses in Semiconductor Laser Amplifiers", IEEE Journal of Quantum Electronics, vol. 25, No. 11, Nov. 1989, pp. 2297-2306.*

* cited by examiner

*Primary Examiner* — Li Liu
(74) *Attorney, Agent, or Firm* — Thomas|Horstemeyer, LLP

(57) ABSTRACT

Systems and methods are disclosed for compensating for impairments caused by a semiconductor optical amplifier (SOA). One such method comprises receiving an optical signal which has been distorted in the physical domain by an SOA, and propagating the distorted optical signal backward in the electronic domain in a corresponding virtual SOA.

4 Claims, 8 Drawing Sheets

US 8,452,191 B2

ELECTRONIC COMPENSATION OF NONLINEAR EFFECTS OF SEMICONDUCTOR OPTICAL AMPLIFIERS

CROSS-REFERENCE TO RELATED APPLICATIONS

This application claims priority to U.S. Provisional Application having Ser. No. 61/162,073 filed Mar. 20, 2009, which is hereby incorporated by reference herein in its entirety.

FIELD OF THE DISCLOSURE

The present disclosure relates to compensating for optical transmission impairments in the electronic or software domain.

BACKGROUND

Channel impairments in transmission systems result in signal degradation and thus limit the carrying capacity of these systems. Knowledge about an impairment can be used to modify a received signal to compensate for the impairment, a technique known as post-compensation. Such compensation systems or devices can be implemented in the optical domain or in the electrical/electronic domain.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The techniques described herein use digital backward propagation in the electrical domain to convert a received optical signal into an estimate of the transmitted signal. In particular, these techniques compensate for nonlinear impairments introduced by semiconductor optical amplifiers (SOAs) residing along the transmission link(s).

Figure 1:
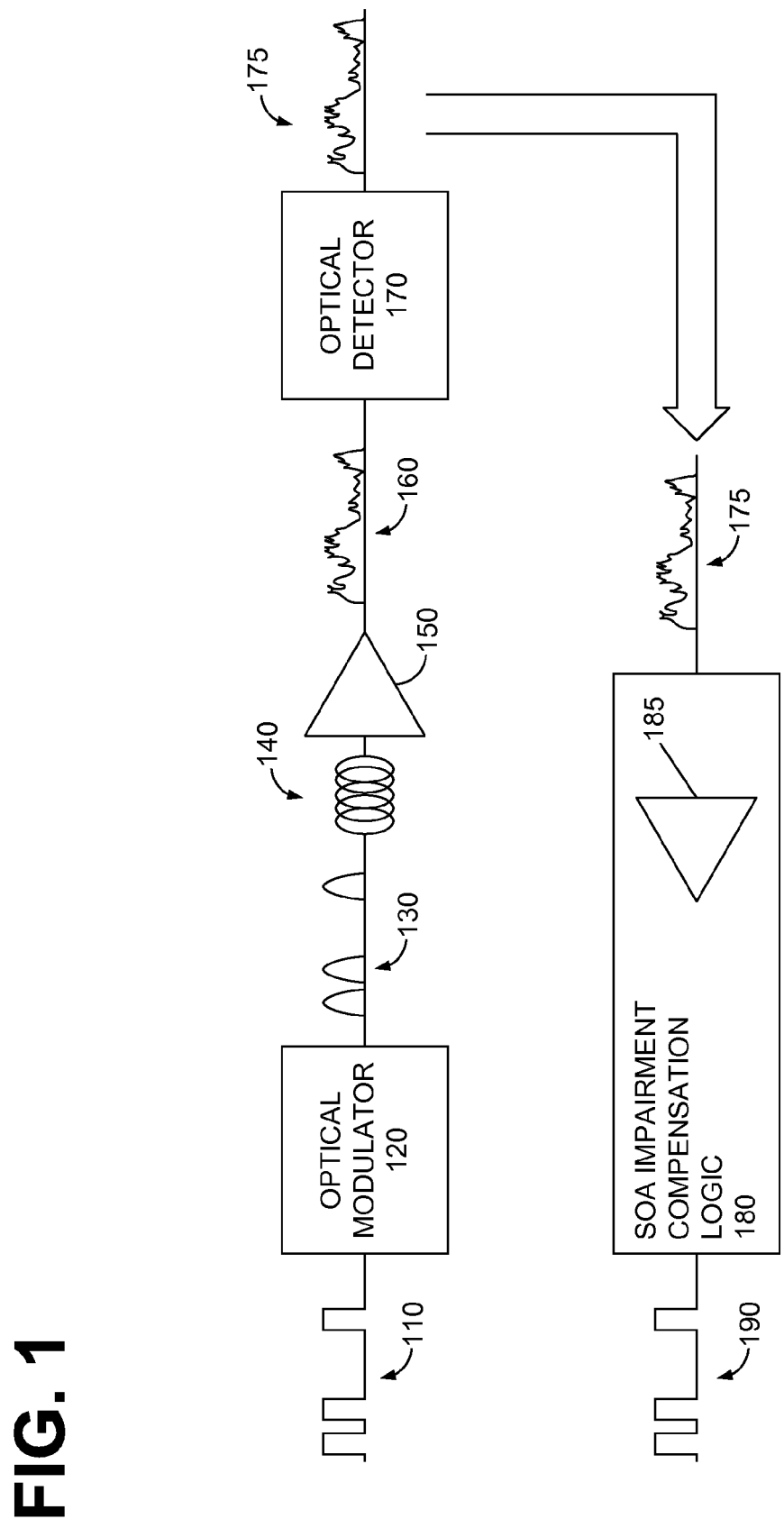
FIG. 1 is a system model diagram of an optical communication system including an embodiment of semiconductor optical amplifier (SOA) impairment compensation logic.

FIG. 1 is a system model diagram of an optical communication system including an embodiment of SOA impairment compensation logic. Transmitted data is carried by an electrical signal 110, which is provided to an optical modulator 120. Optical modulator 120 produces a (modulated) optical signal 130. Although FIG. 1 depicts only a single modulator, it should be appreciated that the principles described herein can be extended to various multiplexing schemes, such as wavelength-division multiplexing and/or polarization-division multiplexing.

Optical signal 130 travels through an optical fiber 140 followed by a semiconductor optical amplifier (SOA) 150. SOA 150 introduces various types of distortion, resulting in a distorted optical signal 160. Distorted optical signal 160 is provided to an optical detector 170, which converts the distorted optical signal to a signal in the electrical domain. Distorted electrical signal 175 is processed in the electrical (digital) domain by SOA impairment compensation logic 180 to remove the distortion produced in the optical (physical) domain. SOA impairment compensation logic 180 operates by modeling the characteristics of SOA 150 in a virtual SOA 185 to account for, and reverse the effect of, nonlinear impairments introduced by SOA 150. The output of SOA impairment compensation logic 180 is a compensated electrical signal 190. Carried within compensated electrical signal 190 is data which is a replica (or near replica) of the originally transmitted data.

Figure 2:
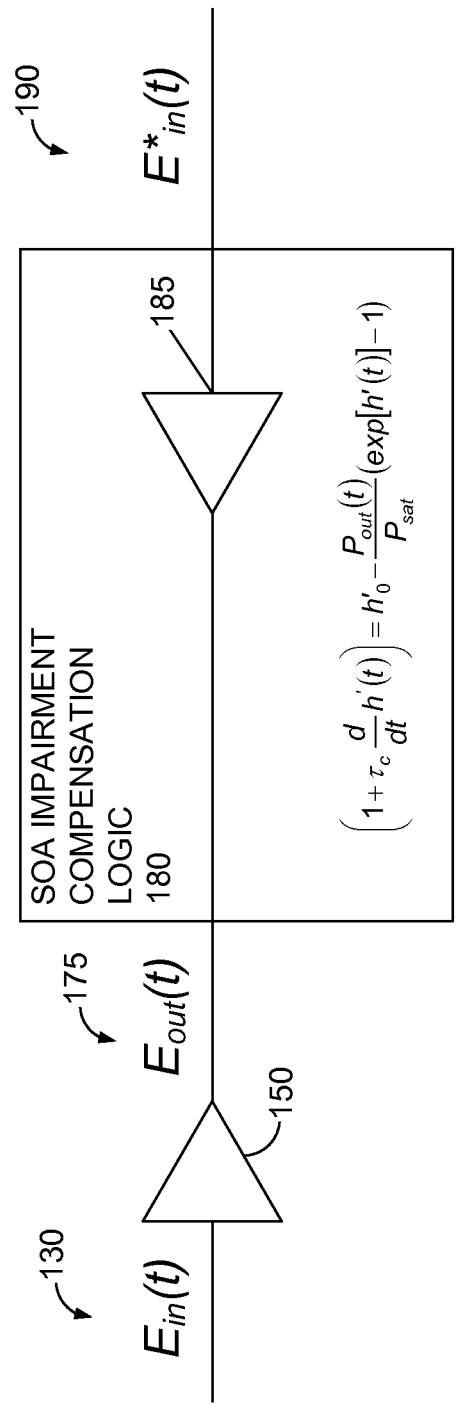
FIG. 2 is a system model diagram of a virtual SOA model used by the SOA impairment compensation logic from FIG. 1, according to some embodiments.

FIG. 2 is a system model diagram of a virtual SOA model used by some embodiments of SOA impairment compensation logic 180. $E_{in}$ is the electric field of the optical signal produced by optical modulator 120 (130 in FIG. 1), which passes through SOA 150. $E_{out}$ is the electric field of the received signal after distortion by SOA 150 (175 in FIG. 1), processed in the electrical (digital) domain by SOA impairment compensation logic 180 to remove the distortion produced in the optical (physical) domain. $E^*_{in}$ is the electric field of the compensated electrical signal (190 in FIG. 1), which carries data that is a replica (or near replica) of the data carried by $E_{in}$.

As noted above, SOA impairment compensation logic 180 operates by modeling the characteristics of SOA 150 as virtual SOA 185. In this regard, intensity $P(Z,T)$, phase $\phi(Z,T)$ and gain $g(Z,T)$ of the signal along SOA 150 can be described by the following equations:

$$\frac{\partial P}{\partial z} = (g - \alpha_{int})P \qquad (\text{Eq. 1})$$

$$\frac{\partial \phi}{\partial z} = -\frac{1}{2}\alpha_H g \qquad (\text{Eq. 2})$$

$$\frac{\partial g}{\partial t} = \frac{g_0 - g}{\tau_c} - \frac{gP}{E_{sat}} \qquad (\text{Eq. 3})$$

where $\alpha_{int}$, $\alpha_H$, $g_0$, $\tau_c$, $E_{sat}$ are the internal loss, linewidth enhancement factor, small-signal gain coefficient, spontaneous carrier lifetime, and saturation energy of virtual SOA 185, respectively. Integrating Eq. 3 over the SOA length (L) and making use of Eq. 1 to eliminate the product gP by ignoring $\alpha_{int}$ and the spatial dependence of the carrier lifetime $\tau_c$ along SOA 150, the overall dynamics for g in virtual SOA 185 are obtained as follows, $$\left(1 + \tau_c \frac{d}{dt}h(t)\right) = h_0 - \frac{P_{in}(t)}{P_{sat}}(\exp[h(t)] - 1) \qquad (\text{Eq. 4})$$

where $$h'(t) = \int_0^L g'(z,t)\,dz \qquad (5)$$

and $h_0 = g_0 L = \ln G_0$; $G_0$ is the small signal gain of virtual SOA 185. $P_{sat} = E_{sat}/T_c$ is the saturation output power of SOA 150. $P_{in}(t) = |E_{in}(t)|^2$ is the input signal intensity of virtual SOA 185.

SOA impairment compensation logic 180 propagates distorted electrical signal 175 backward in virtual SOA 185 (in the digital domain) by replacing $\partial/\partial z$ with $\partial/\partial(-z)$ in Eq. 1-3. This is equivalent to reversing the signs of gain and loss as follows:

$$\frac{\partial P}{\partial z} = (g' - \alpha'_{int})P \qquad \text{(Eq. 5)}$$

$$\frac{\partial \phi}{\partial z} = -\frac{1}{2}\alpha_H g' \qquad \text{(Eq. 6)}$$

$$\frac{\partial g'}{\partial t} = \frac{g'_0 - g'}{\tau_c} - \frac{g'P}{E_{sat}} \qquad \text{(Eq. 7)}$$

where $g' = -g$, $\alpha'_{int} = -\alpha_{int}$, $g'_0 = -g_0$.

Eqs. 5 to 7 cannot be solved analytically and thus numerical methods are developed. One numerical method, called the transmission line method, splits virtual SOA 185 into a number of sections along the signal propagation direction z.

Figure 3:
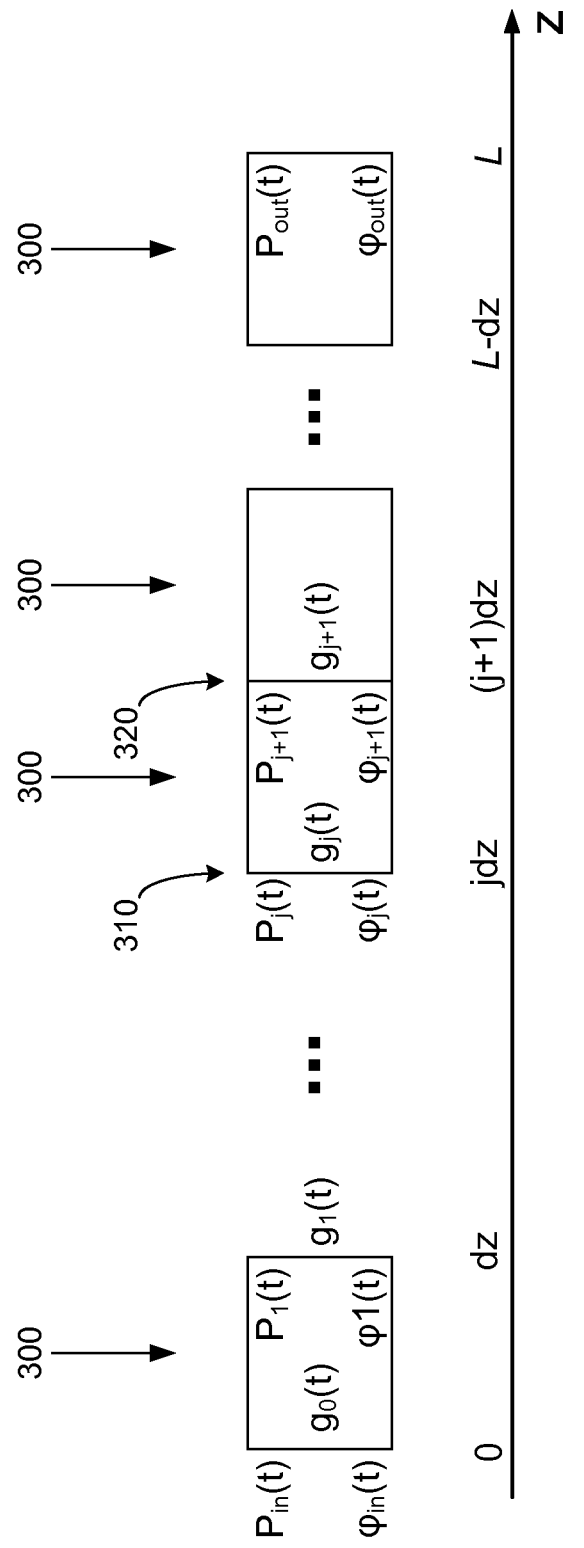
FIG. 3 illustrates the transmission line method according to some embodiments.

FIG. 3 illustrates the transmission line method. In each section 300, signal gain $g_j(t)$ is estimated by solving Eq. 7 numerically, knowing the signal intensity $P_j(t)$ at the previous section interface 310. Then $g_j(t)$ is assumed to be constant for the current section 300 and thus signal intensity $P_{j+1}(t)$ and signal phase $\phi_{j+1}(t)$ at the next section interface 320 are calculated by solving Eq. 5 and Eq. 6, respectively. Following this procedure, the signal intensity, phase and gain are calculated iteratively until the output of virtual SOA 185.

Another method involves integrating Eq. 7 over the virtual SOA length (L). By making use of Eq. 5 to eliminate the product g'P by ignoring $\alpha'_{int}$ and the spatial dependence of the carrier lifetime $\tau_c$ along virtual SOA 185, the overall dynamics for g' for compensation of SOA impairment can be obtained as follows, $$\left(1 + \tau_c \frac{d}{dt}\right) h'(t) = h'_0 - \frac{P_{out}(t)}{P_{sat}}(\exp[h'(t)] - 1) \qquad \text{(Eq. 8)}$$

where $$h'(t) = \int_o^L g'(z,t)\,dz$$

and $h'_0 = -g_0 L = -\ln G_0$. $P_{out}(t) = |E_{out}(t)|^2$ is the output signal intensity of the physical SOA 150 and is also used as input for virtual SOA 185 in performing impairment compensation.

Solving Eqs. 5, 6 and 8, the electric field of compensated electrical signal 190 can be written as $$E^*(t) = E_{out} \cdot \exp\left[\frac{(1 - i\alpha_H)h'(t)}{2}\right] \qquad \text{(Eq. 9)}$$

Some embodiments which use the 4th order Runge-Kutta algorithm to solve Eq. 8 numerically, as follows:

$$h_1 = \left\{-h_0 - h^*(i-1) + \frac{P_{out}(i-1)}{P_{sat} \cdot \tau_c}[e^{h^*(i-1)} - 1]\right\} \cdot \frac{dt}{\tau_c} \qquad \text{(Eq. 10)}$$

$$h_2 = \qquad \text{(Eq. 11)}$$
$$\left\{-h_0 - [h^*(i-1) + h_1/2] + \frac{P_{out}(i-1)}{P_{sat} \cdot \tau_c}(e^{h^*(i-1)+h_1/2} - 1)\right\} \cdot \frac{dt}{\tau_c}$$

$$h_3 = \qquad \text{(Eq. 12)}$$
$$\left\{-h_0 - [h^*(i-1) + h_1/2] + \frac{P_{out}(i-1)}{P_{sat} \cdot \tau_c}[e^{h^*(i-1)+h_2/2} - 1]\right\} \cdot \frac{dt}{\tau_c}$$

$$h_4 = \left\{-h_0 - [h^*(i-1) + h_3] + \frac{P_{out}(i-1)}{p_{sat} \cdot \tau_c}[e^{h^*(i-1)+h_3} - 1]\right\} \cdot \frac{dt}{\tau_c} \qquad \text{(Eq. 13)}$$

$$h^*(i) = h^*(i-1) + h_1/6 + h_2/3 + h_3/3 + h_4/6. \qquad \text{(Eq. 14)}$$

where dt is the sample interval and the optimal $T_c$ is found by a global search.

Figure 4:
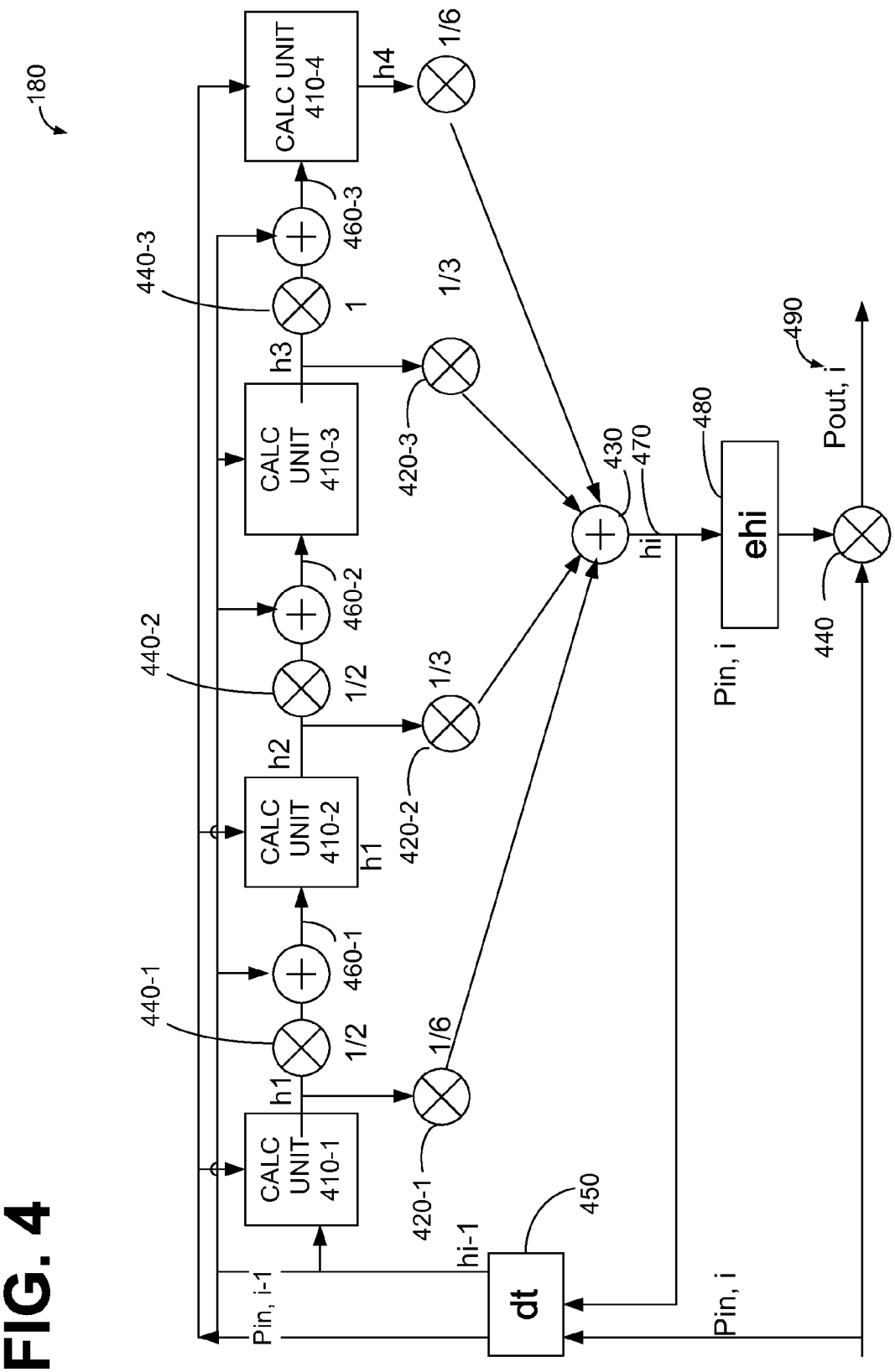
FIG. 4 is a block diagram of the SOA impairment compensation logic from FIG. 1 according to some embodiments.

FIG. 4 is a block diagram of SOA impairment compensation logic 180 according to some embodiments which use the 4th order Runge-Kutta algorithm described above. The embodiment of logic 180 shown in FIG. 4 includes several instances of a calculation unit 410 which operates on intensity parameter P: subunit 410-1 is used to generate $h_1$; subunit 410-2, is used to generate $h_2$; subunit 410-3 is used to generate $h_3$; and subunit 410-4 is used to generate $h_4$. The output of each subunit instance is scaled (blocks 420-1 . . . 420-4) according to Eq. 10-14, then the outputs are summed (block 430) per Eq. 14. Another set of scalers (blocks 440-1 . . . 440-3) are applied to outputs $h_1$ $h_2$ $h_3$ from corresponding sub-unit instances. Each corresponding scaled output $h_1$ $h_2$ $h_3$ is added to the previous sample of $h_{i-1}$, as provided by a delay block 450, to produce intermediate sums 460-1 . . . 460-3. Each intermediate sum 460 is provided to the next calculation unit 410. Intermediate output $h_i$ (470) from summation block 430 is fed back into the subunit 410-1 as $h_{i-1}$ for calculation of h at next sampling time. The number of samples i is equal to the temporal length of the signal divided by the sample interval. Finally, intermediate output $h_i$ and $P_{in}$ are provided to natural logarithm operator 480, which is combined with $P_{in,i}$ to produces final output $P_{out,i}$ (490).

Figure 5:
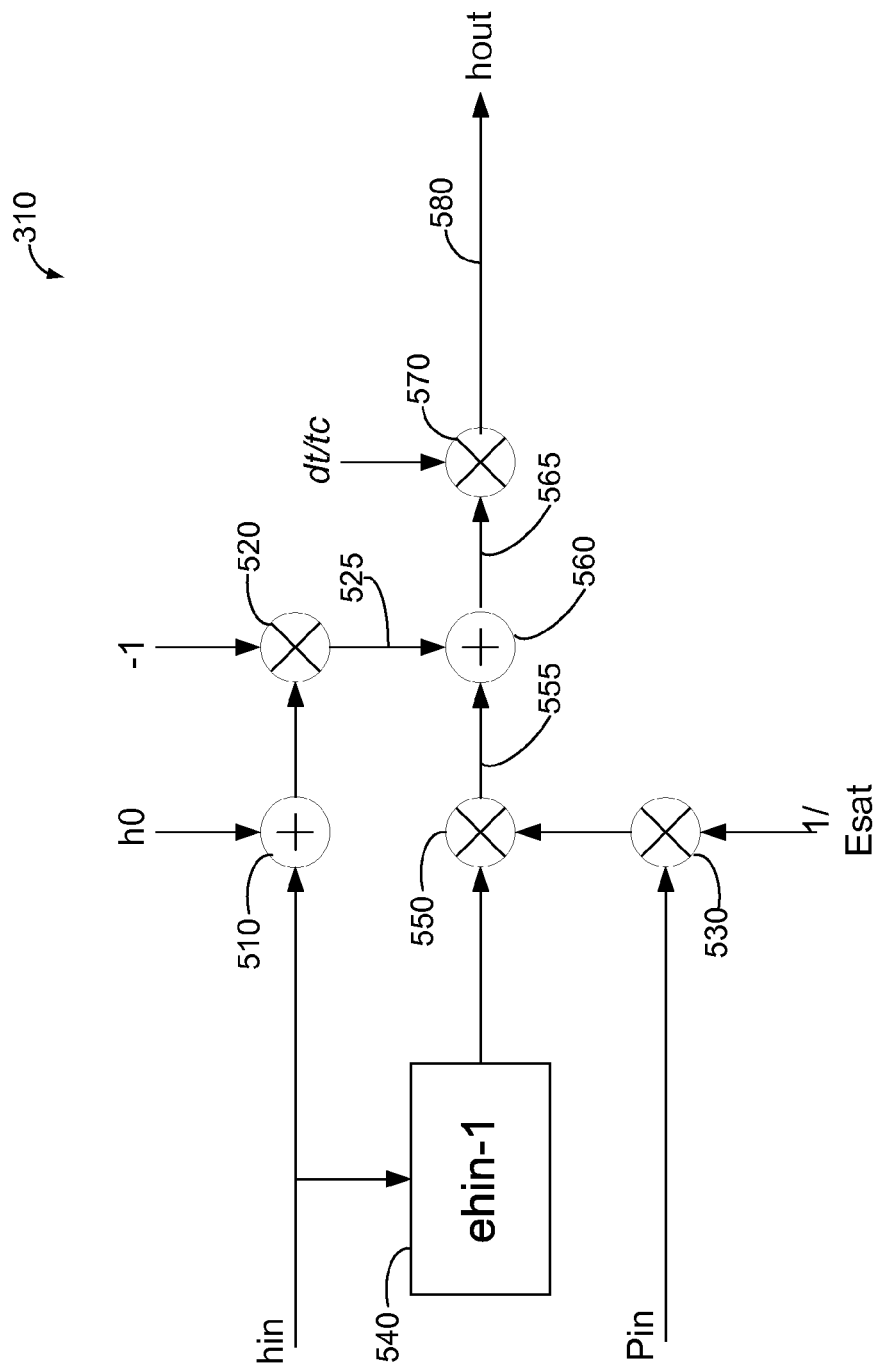
FIG. 5 is a block diagram of the calculation unit from FIG. 4, according to some embodiments.

FIG. 5 is a block diagram of calculation unit 410. Input $h_{in}$ is summed (block 510) with $h_0$, then the sign of the sum is reversed (block 520) to produce intermediate output 525. Input $P_{in}$ is scaled (block 530) by the inverse of $E_{sat}$. Natural logarithm operator 540 is applied to $h_{in}$. The log value produced by operator 540 is then multiplied (block 550) by the scaled $P_{in}$. The product 555 is summed (block 560) with intermediate output 525 to produce another intermediate output 565. Intermediate output is multiplied (block 570) by $dt/t_c$ to produce final output $h_{out}$ 580.

Figure 6:
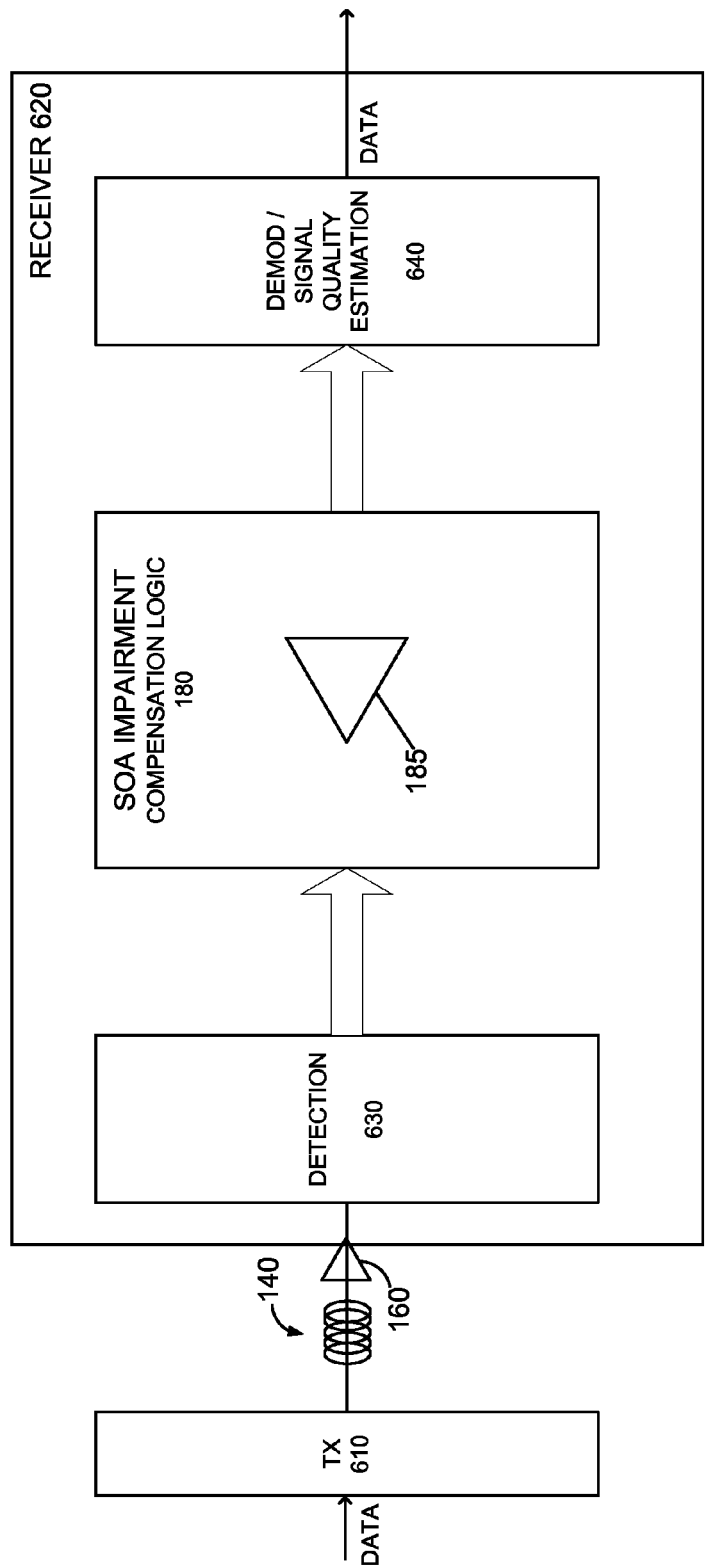
FIG. 6 is a block diagram of a communication system utilizing the SOA impairment compensation logic from FIG. 1, according to some embodiments.

FIG. 6 is a block diagram of a communication system utilizing an embodiment of SOA impairment compensation logic 180. A transmitter 610 modulates incoming optical signals according to (electrical) data signals and transmits the modulated optical signals over optical fiber 140 followed by SOA 150. It should be appreciated that various technologies and mechanisms can be used for amplification and modulation.

A receiver 620 receives the optically amplified signal. A detector 630 processes the received signal and outputs the electrical field of the signal to SOA impairment compensation logic 180. In some embodiments, the received electric field after SOA 150, $E_{out}(t)$, is measured using coherent detection. Other embodiments, such as those where the SOA nonlinearities are dominant and signal is not distorted from fiber impairments (e.g., an intensity-modulation direct-detection system) use direct detection. Logic 180 performs compensation using virtual SOA 185 as described above. The compensated signal produced by SOA impairment compensation logic 180 is provided to demodulator 640. Some embodiments of demodulator 640 also perform signal quality estimation. The originally transmitted data is thus recovered by receiver 620.

While SOA impairment compensation logic 180 does not itself compensate for impairments produced by optical fiber 140, logic 180 can be used in conjunction with additional logic that compensates for fiber impairments such as chromatic dispersion, Kerr non-linearities, etc. Various embodiments of fiber impairment compensation logic are described in U.S. Patent Publication 20090214215, which is hereby incorporated herein in its entirety.

Figure 7:
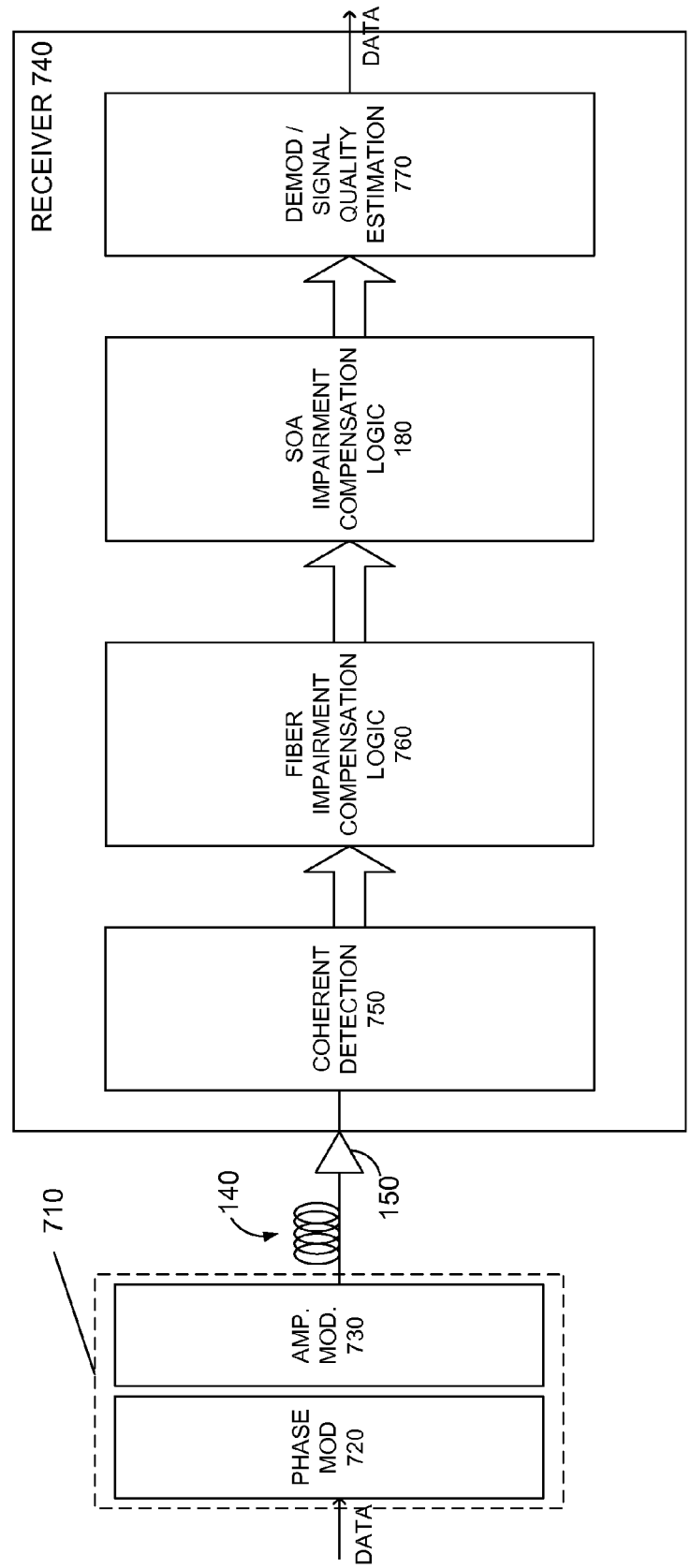
FIG. 7 is a block diagram of a communication system utilizing the SOA impairment compensation logic from FIG. 1 in combination with fiber compensation logic, in accordance with some embodiments.

FIG. 7 is a block diagram of a communication system utilizing an embodiment of SOA impairment compensation logic 180 in combination with an embodiment of fiber compensation logic. A transmitter 710 includes a phase modulator 720 followed by an amplitude modulator 730 that perform successive modulation on incoming optical signals according to (electrical) data signals. The modulated optical signals are transmitted over optical fiber 140 followed by SOA 150.

A receiver 740 receives the optically amplified signal. A coherent detector 750 processes the received signal and outputs the electrical field (in-phase and quadrature components) of the signal to SOA impairment compensation logic 180. Fiber impairment compensation logic 760 performs backward propagation to solve a nonlinear Schrodinger equation describing optical fiber 140, thus compensating for impairments produced by optical fiber 140. Following fiber compensation, SOA impairment compensation logic 180 performs compensation for impairments caused by SOA 150, by modeling virtual SOA 185 as described above. The compensated signal produced by SOA impairment compensation logic 180 is provided to demodulator 770. Some embodiments of demodulator 770 also perform signal quality estimation. The originally transmitted data is thus recovered by receiver 740.

Figure 8:
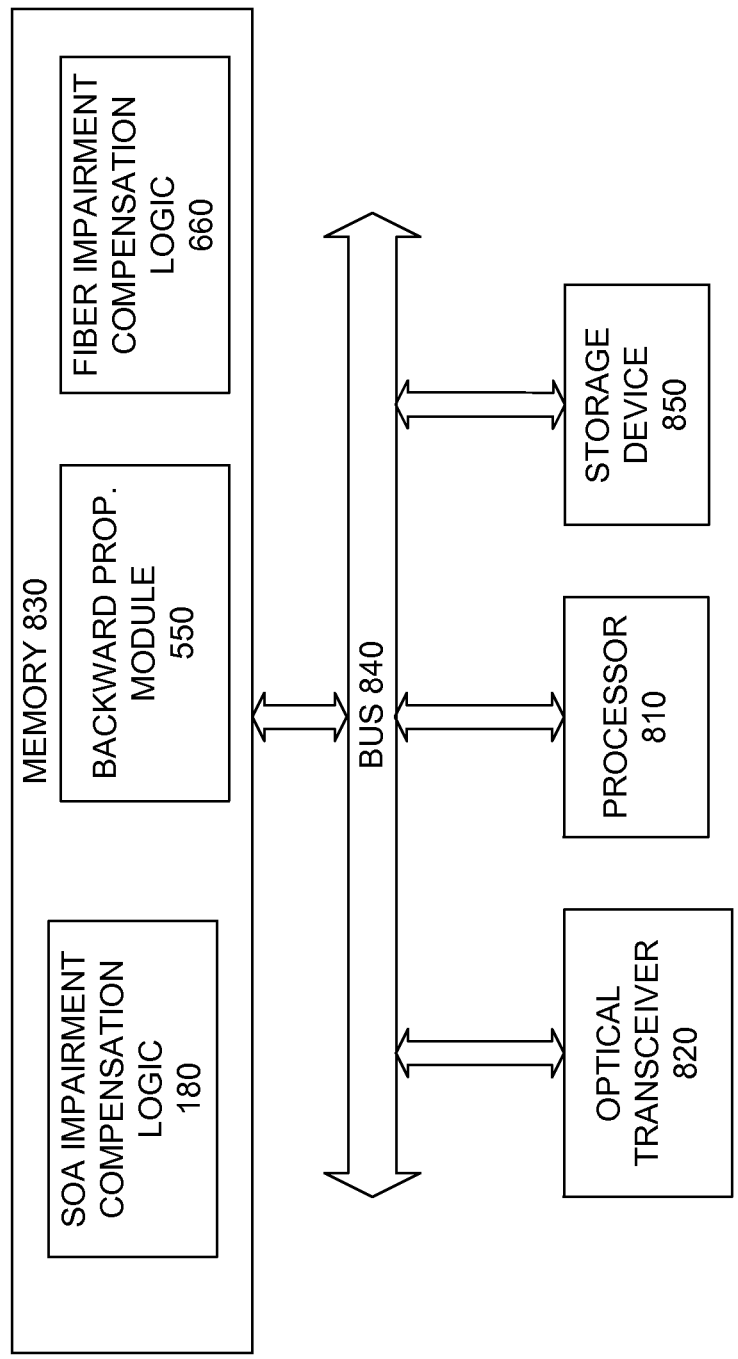
FIG. 8 is a hardware block diagram of the receiver from FIG. 6 or FIG. 7, according to some embodiments.

FIG. 8 is a hardware block diagram of an embodiment of receiver 620 or receiver 740. Receiver 620/740 contains a number of components that are known in the electronics and computer arts, including a processor 810 (e.g., microprocessor, digital signal processor, microcontroller, digital signal controller), an optical transceiver 820, and memory 830. These components are coupled via a bus 840. Some embodiments also include a storage device 850, such as non-volatile memory or a disk drive. Omitted from FIG. 8 are a number of conventional components that are unnecessary to explain the operation of receiver 620/740.

In the embodiment of FIG. 8, SOA impairment compensation logic 180 and/or fiber impairment compensation logic 760 reside in memory 830 as instructions which, when executed by processor 810, implement systems and methods of impairment compensation as described herein.

In other embodiments (not shown), SOA impairment compensation logic 180 and/or fiber impairment compensation logic 760 is implemented in specialized hardware logic, including, but not limited to, a programmable logic device (PLD), a programmable gate array (PGA), a field programmable gate array (FPGA), an application-specific integrated circuit (ASIC), a system on chip (SoC), and a system in package (SiP).

SOA impairment compensation logic 180 and/or fiber impairment compensation logic 760 can be embodied in any computer-readable medium for use by or in connection with a processor. In the context of this disclosure, a "computer-readable medium" can be any means that can contain or store the instructions for use by the processor. The computer readable medium can be, for example but not limited to, a system or that is based on electronic, magnetic, optical, electromagnetic, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of compensating for impairments caused by a semiconductor optical amplifier (SOA), the method comprising:
   receiving an optical signal which has been distorted in the physical domain by an SOA;
   modeling a virtual SOA according to a set of equations which describe intensity $P(Z,T)$, phase $\phi(Z,T)$ and gain $g(Z,T)$ along the SOA in terms of a combination of virtual SOA parameters which are opposite in value to corresponding physical SOA parameters, the virtual SOA parameters including at least one of internal loss, linewidth enhancement factor, small-signal gain coefficient, spontaneous carrier lifetime and saturation energy;
   solving the set of equations using a Runge-Kutta algorithm; and
   propagating the distorted optical signal backward in the electronic domain in a corresponding virtual SOA.

2. The method of claim 1, further comprising:
   solving the set of equations by using a transmission line method to divide SOA into many sections.

3. A receiver comprising
   memory containing instructions stored thereon;
   a processor;
   an optical detector configured to receive an optical signal which has been distorted in the physical domain by a semiconductor optical amplifier (SOA) and further configured to provide a corresponding distorted electrical signal to the processor, wherein the processor is configured by the instructions to:

model a virtual SOA according to a set of equations which describe intensity $P(Z,T)$, phase $\phi(Z,T)$ and gain $g(Z,T)$ along the SOA in terms of a combination of virtual SOA parameters which are opposite in value to corresponding physical SOA parameters, the virtual SOA parameters including at least one of internal loss, linewidth enhancement factor, small-signal gain coefficient, spontaneous carrier lifetime and saturation energy;

solve the set of equations using a Runge-Kutta algorithm; and propagate the distorted electrical signal backward in the electronic domain in a corresponding virtual SOA.

4. The receiver of claim 3, wherein the processor is further configured to:

solve the set of equations by using a transmission line method to divide SOA into many sections.

* * * * *